Jan. 7, 1941.  R. E. LAUFER  2,227,787
WRAPPING MATERIAL AND METHOD OF MAKING THE SAME
Filed Oct. 12, 1938
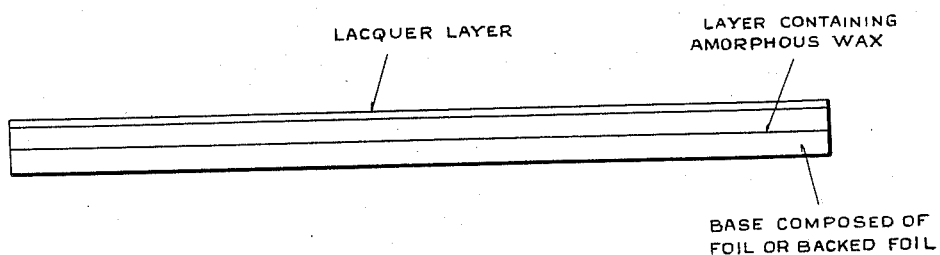
Inventor
Roger E. Laufer
By Cameron, Kerkam + Sutton Patented Jan. 7, 1941

2,227,787

UNITED STATES PATENT OFFICE 2,227,787

WRAPPING MATERIAL AND METHOD OF MAKING THE SAME

Roger E. Laufer, Louisville, Ky., assignor to Reynolds Metals Company, New York, N. Y., a corporation of Delaware Application October 12, 1938, Serial No. 234,697

7 Claims. (Cl. 91—70)

This invention relates to moistureproof material and, more particularly, to a moistureproof material adapted to being sealed by heat and pressure without the application of separately applied adhesive at the moment of sealing.

Even more particularly the present invention relates to a novel material which will form a good, strong and reliable seal when heat and pressure are applied at the time of sealing and which is applicable when one or both surfaces of the material to be united are of foil.

More particularly still the present invention relates to a moistureproof, flexible wrapping material which is coated with a moistureproof heat-sealing material which has excellent aging qualities, practically no odor, pleasing color, non-blocking qualities when spooled in roll form or stacked in sheets, and retains a good seal at a wide range of temperatures.

According to the present invention I have found that a good, strong and reliable heat-sealing and moistureproof material can be made by coating any suitable material, including foil or foil adhered to various web materials, with amorphous mineral waxes or combinations thereof, with or without other suitable substances, over which is coated a thin layer of lacquer or any other suitable film forming dope.

Numerous materials have heretofore been made capable of being sealed around objects by the application of heat and pressure. These have included foil and foil mounted on other web materials coated on one or both sides with a layer of thermoplastic material such as mineral or vegetable waxes, paraffins, synthetic or natural resins, rubber compounds, etc. These materials have been widely used but are subject to certain disadvantages from the standpoint of both manufacture and use.

Where paraffins have been used as the sealing material in the coating of foil or the coating of a web material on which foil has been mounted, a good strong heat seal has not been effected, due primarily to the lack of tenaciousness of the paraffin to the metal surface. The tensile and shearing strength of the paraffin is not sufficient under various conditions of temperature and stress to form a good seal. Paraffin in a number of cases has been found to be brittle or not flexible enough to form a strong seal. These undesirable results are due to the nature of the crystalline structure and oil content of the paraffin itself. Even in cases where paraffin has been found to form a satisfactory seal such large quantities of paraffin must be applied that during the sealing operation the flow of paraffin caused by heat and pressure extends beyond the sealing area marring the appearance of the material.

Where certain waxes, natural or synthetic lacquers, resins, natural or synthetic rubbers or hydrocarbons have been used as a thermoplastic heat-sealing material coated on foil or coated on a web material to which foil has been attached, a strong, satisfactory heat seal has not been effected for a number of reasons. A strong heat sealing material for use on wrapping materials must have a number of qualities. Among others it must age well, i. e., not deteriorate or change with age so that the sealing qualities are affected; it must have an adequate tensile strength; it must heat seal at comparatively low temperatures for rapidity of operation on the heat-sealing machines; it should have little or no odor, so that the articles wrapped will not be affected; it should be sufficiently hard so that when spooled in roll form or stacked in sheets it will not offset or block at ordinary temperatures; it must retain a strong seal through predetermined temperature ranges; it must not be brittle after sealing; the color should ordinarily be of a pleasing nature; it must have good adhesion to itself and to metal surfaces; the materials must be non-toxic for a number of uses; and the materials should be as cheap as is consistent with the use to which they are to be put.

These thermoplastic heat-sealing materials or coatings heretofore developed from certain waxes, natural or synthetic lacquers, resins, hydrocarbons, rubbers, or combinations of these various materials, usually lack one, and more often, several of the qualities enumerated above, causing them to be unsatisfactory for general use. An outstanding fault of materials heretofore used is their lack of adhesion to metal or foil surfaces. Foil surfaces are smooth, hard, non-porous and do not afford extensions—such as fibres on paper—to which a heat-sealing substance may adhere. Substances to be used to heat-seal foil surfaces must have great surface tension or adhesion for the metal at ordinary temperatures and when in a solid state. In order to obtain this necessary surface tension or adhesion of the heat-sealing substances to the foil surface, the substances must be plasticized to give adhesion to the foil, but in plasticizing the internal tensile strength of the heat-sealing substances is lost, leaving the heat-sealing substances in such a soft state that they will offset or block to the next sheet or next round in roll form. This has heretofore been a primary objection to known heat-sealing substances, especially with lacquer or resinous types of thermoplastic heat-sealing materials.

Another fault of lacquer or resinous types of thermoplastic heat-sealing materials is that coats heavy enough to seal when heat is applied cannot be dried thoroughly throughout the thickness of the coat during manufacture. That is, the solvents cannot be driven from the lacquer evenly and a thin skin forms over the surface of the lacquer, causing the solvents to be retained. If the solvents are retained these lacquers block or offset to the adjacent round in roll form, or the next sheet in a stack, under slight pressure.

Known wax types of heat-sealing materials uncombined or combined with resins without overcoating are unsatisfactory for if the wax is hardened by the addition of resins or other materials to keep the wax from offsetting or blocking, the wax loses its adhesive properties for foil. If the blocking qualities are controlled by the addition of resinous materials or other substances the known wax types may become too hard and brittle, causing them to crack and flake. Waxes that are hard enough to be used by themselves without blocking will have a tendency to crack upon folding and their melting points are so high they do not afford a rapid seal on standard heat seal machines.

The present invention provides a novel heat-sealing material suitable for many purposes, especially as a wrapping material, having all of the desirable qualities above described and free of the many disadvantages common to heat-sealing substances heretofore used.

In carrying out my invention, broadly stated, I apply to a foil on one or both sides or to a foil attached to paper or other suitable web material, such as cloth or fibrous material, on either the foil side or the web material side, or both sides, a layer of amorphous wax or a combination of amorphous waxes, with or without other substances as hereinafter explained, and then apply a thin layer of lacquer over the amorphous wax layer or layers. The wax and lacquer top coat may be applied on one or both sides of the foil by itself or to foil attached to web material on either the foil side or the web material side or both sides.

The amorphous wax may be applied to the foil or to the web to which foil has been attached by any suitable coating method known to those skilled in the art, such as by roller coating, doctor blade methods and the like. The amorphous wax should be applied at temperatures as close as possible to the melting point of the wax, so that when absorbent web materials are used there will be a minimum penetration of the wax into the web material. The melting point of the wax must be controlled to form a smooth continuous film over the foil or web material. Films of wax that do not have a smooth surface may cause an uneven coating of the top coat lacquer. Smooth, continuous coatings of wax are also desirable to prevent blocking of the sealing material to the adjacent sheet or round when in roll form as uneven pressure at high points of the wax film may cause offsetting or blocking.

The lacquer may be applied over the wax by any suitable method known to those skilled in the art, such as roller coating, doctor blade methods, spraying and the like. It is preferable to have the wax chilled at the time of applying the lacquer, to avoid any diffusion of the lacquer into the wax and to provide a continuous, unbroken, smooth film of lacquer over the wax surface. If the lacquer film is not continuous, the amorphous wax tends to penetrate through and offset on the next adjacent sheet or round when in roll form.

The coating of the amorphous wax and the overcoating of the lacquer is preferably performed in a continuous operation, since, if the wax is allowed to come to normal or room temperature, difficulty is encountered in applying an even coating of lacquer, due to the usual tackiness of the wax.

After application the lacquer may be dried in any conventional or desirable manner, as by passing the entire coated web through a warm air chamber. Care must be taken to use drying temperatures which will not cause the wax to soften or melt and penetrate into the web especially if the web is of an absorbent nature, as in the case of certain papers. The wax and lacquer must not fuse together. The temperature at which the drying is effected is preferably so controlled that the wax does not become heated to a temperature above approximately 25° F. below the melting point of the wax. The drying of the lacquers however can be carried out at room temperature with satisfactory results, but at the cost of increased time of drying.

When the foil is mounted on paper and coated on the paper side with the heat-sealing material of the present invention it has been found that hard surfaced papers, such as glassine, afford very satisfactory results. Less heat-sealing material need be applied, because these hard surfaced papers are less absorbent. The heat-sealing material is also not absorbed into the paper as readily at the time the seal is being made, thus allowing more of the heat-sealing material to remain between the two surfaces being sealed.

In cases where the foil or foil attached to a web material is coated with wax and overcoated with lacquer on both sides, the waxing and lacquering operations may be performed for one side and then repeated for the other or both coatings may be applied simultaneously.

Foil as referred to above may be made from any suitable metals or combinations thereof. Metals most commonly used for making foil are lead, tin, zinc, aluminum and copper or combinations of same. Foil is usually manufactured by rolling methods, but can be manufactured by electrical deposition or beating, the making of the foil being no part of the present invention. The foil may be of any thickness suitable for the intended wrapping or sealing purpose. Foils of thickness of .01" or thinner usually are satisfactory. The foil is adhered to the web material, such as paper or cloth, by any satisfactory adhesive. Such adhesives may be glues of either an animal, vegetable or mineral nature, lacquers, resins, asphalts, waxes, paraffins, or rubbers all as known to those skilled in the art of mounting foil.

The amorphous waxes referred to above are preferably hydrocarbon mineral waxes and are tough, ductile, tenacious in character, practically immune to corrosive acids and hot alkalies, and are highly moistureproof. There amorphous plastic waxes are derived from petrolatums, being the waxy by-products secured in the solvent dewaxing of viscous residual and distillate oils. To those skilled in the art, the differences are well known between paraffin waxes and amorphous waxes, both in methods of manufacture and physical properties. Their melting points usually vary in range from 150° F. to 185° F. Their color may vary from light lemon colors through black. These amorphous waxes vary in hardness, ductility and tackiness. According to the present invention I may use any one of the amorphous waxes or combinations thereof, depending on the purpose desired. As an example, if the wrapper will be subject to severe pressure in roll form before use, I prefer to use the harder amorphous waxes to prevent danger of offsetting or blocking. If desirable, to reduce its tackiness, natural or synthetic resins, gums of various types, rubbers, plastic hydrocarbons other than the amorphous waxes, fillers, or similar materials may be added in limited quantities to the amorphous wax, to give it properties of hardness or adhesive qualities that are desired for special uses. In any of such mixtures the amorphous wax or waxes should predominate.

The quantity of amorphous wax that may be applied to the foil or to the foil attached to web material, either on one or both sides, may amount to 1 pound per ream (24″ x 36″ x 480 sheets) or more. In the coating of unmounted foil quantities of from 1 to 5 pounds of amorphous wax per ream are usually sufficient but more may be applied. In applying amorphous wax to web material, quantities of wax ranging in weight from 5% to 100% of the web material weight may be used, according to the absorbency of the web material surface for the wax.

The following combinations are illustrative of what may be used depending on the characteristics desired:
1. 100% amorphous mineral wax or combinations of 100% amorphous mineral waxes.
2. 98% amorphous mineral wax or combinations of such waxes, 2% stearic acid.
3. 95% amorphous mineral wax or combinations of such waxes, 5% canauba wax.
4. 97% of amorphous mineral wax or combinations of such waxes, 3% polyisobutylene.

As described above the film covering the wax may be any suitable lacquer, such as cellulose derivatives, shellacs, or any other film forming dope that will prevent offsetting of the wax. The lacquer must be of such a nature and thickness that it will allow the wax to melt and break through the film when heat is applied during the heat-sealing operation. It has been found that plasticizers are not usually necessary in the lacquer but they may be used in certain cases to give initial tack to the lacquer when heat is applied during the heat-sealing operation. Typical lacquers are:
Shellacs with suitable solvents.
Shellacs and cellulose derivatives with suitable solvents.
Cellulose derivatives with suitable solvents.

Illustrative lacquers may be of the following compositions:

| | | Parts |
|---|---|---|
| A. | 2½ lbs. shellac dissolved per gal. alcohol_ | 2 |
| | 25% solids ½ second nitrocellulose dissolved in ethyl acetate_____ | 1 |
| | Alcohol _____ | ½ |
| | Ethyl acetate_____ | ½ |
| B. | 2½ lbs. shellac dissolved per gallon alcohol _____ | ½ |
| | 25% solids ½ second nitrocellulose dissolved in ethyl acetate_____ | 2 |
| | Alcohol _____ | ½ |
| | Ethyl acetate_____ | ½ |
| C. | 25% solids ½ second nitrocellulose dissolved in ethyl acetate_____ | 1 |
| | Alcohol _____ | ½ |
| | Ethyl acetate_____ | ½ |
| | Petro benzol_____ | ¼ |

The quantity of solids of lacquer desirable per ream (24″ x 36″ x 480 sheets) may vary from one-half pound of solids to three pounds of solids for most purposes, but greater quantities may be applied. The quantity of solids desirable varies with the quantity, tackiness, and smoothness of the amorphous wax film. The less quantity of wax applied, the harder the wax, the smoother the wax film, the less quantity of lacquer solids need be applied. The thinner, less tacky, and smoother the wax film, the softer the lacquer film need be. The lacquer film should not prevent the oil in the wax from softening the lacquer film during the heat-sealing operation or prevent the wax from rupturing the lacquer film, fusing with it and making a strong seal with the opposed surface during the heat-sealing operation.

The accompanying drawing shows diagrammatically and on an enlarged scale an embodiment of the present invention wherein the base which may be foil or foil suitably backed on one side so as to leave at least one free metal face is coated as heretofore described with a layer containing amorphous wax on which is superposed a lacquer layer, it being understood that said coats may be applied to either or both faces of said base material.

Materials made according to the present invention are particularly suited for use as wrapping materials adapted to enclose cartons, cigars, fruit, tobacco, food products, meats, chemicals, pharmaceutical products such as tablets, particularly hygroscopic materials such as sugars, cereals, hygroscopic chemicals of the character of calcium chloride and sodium thiosulphate. They are also well adapted for enclosing products which must be protected from loss of moisture, such as fresh fruits, freshly dried fruits, candy, bread, bakery products and any other product which must be protected from gain or loss of moisture, oxidation, or other atmospheric deterioration or contamination by air-borne odors or contaminating gases. It may be used for labels or seals or for bottle cap liners.

It will now be apparent that the present invention provides a novel moistureproof material capable of being sealed by heat and pressure without the addition of adhesive at the time of sealing, affording good sealing properties to foil surfaces, and one which is moistureproof, of excellent aging quality, free from objectionable odor, of pleasing color, non-blocking, cheap, and forming and retaining a strong bond through a wide range of temperatures. To those skilled in the art it will now be apparent that a considerable latitude in the choice of web material, foil, amorphous wax and film forming dope is possible without departing from the inventive concept of the present invention. To determine the scope of the present invention reference should be had to the appended claims wherein the term amorphous wax is used to embrace either a single wax as described or a combination of such waxes, with or without other materials mixed therewith as heretofore explained; it is also to be expressly understood that the expressions used in said claims "said base including a metal foil" or "a base which includes a metal foil" mean that the base utilizes a foil either with or without a backing layer therefor as hereinbefore explained in detail.

What is claimed is:
1. A moistureproof flexible material adapted to be used for wrappers or the like and comprising a base, said base including a metal foil having at least one free face and a coating on at least one side of the base and adapted to provide a heat seal which includes the adhesion of said coating to said foil, said coating being composed of a layer of thermoplastic material in which amorphous wax predominates by percentage and a continuous layer of a fusible lacquer which will prevent offsetting but permit thermoplastic sealing of said wax-containing layer to an opposed surface covering the exterior surface of said first named layer.

2. A moistureproof flexible material adapted to be used for wrappers or the like and comprising a base, said base including a metal foil having at least one free face, and a coating on at least one side of the base and adapted to provide a heat seal which includes the adhesion of said coating to said foil, said coating being composed of a layer of thermoplastic material in which amorphous mineral wax predominates by percentage and a continuous layer of a lacquer which will prevent offsetting but which will soften under heat and permit thermoplastic sealing of said wax-containing layer to an opposing surface, said last named layer covering the exterior surface of said first named layer.

3. A moistureproof flexible material adapted to be used for wrappers or the like and comprising a base, said base including a metal foil which has at least one free face, and a coating on at least one side of the base and adapted to provide a heat seal which includes the adhesion of said coating to said foil, said coating being composed of a layer of thermoplastic material in which amorphous wax predominates by percentage and a continuous lacquer layer covering the exterior surface of said first named layer for preventing offsetting of the wax, said lacquer layer adapted to permit passage of the wax therethrough when heat is applied to form a seal under heat and pressure.

4. A moistureproof flexible material adapted to be used for wrappers or the like and comprising a base, said base including a metal foil which has at least one free face, and a coating on at least one side of the base and adapted to provide a heat seal which includes the adhesion of said coating to said foil, said coating being composed of a layer of thermoplastic material in which amorphous mineral wax predominates by percentage and a continuous lacquer layer covering the exterior surface of said first named layer for preventing offsetting of the wax, said lacquer layer adapted to soften under heat and permit passage of the wax therethrough to form a seal under heat and pressure.

5. The method of forming a moistureproof flexible material adapted to be used for wrappers or the like and which comprises applying to at least one side of a base which includes a metal foil having at least one face free, a coating of thermoplastic material in which amorphous wax predominates by percentage and applying to the exterior surface of said coating a continuous layer of lacquer which will prevent offsetting of the wax but permit passage of the wax therethrough when heat is applied to form a seal under heat and pressure.

6. The method of forming a moistureproof flexible material adapted to be used for wrappers or the like and which comprises applying to at least one side of a base which includes a metal foil having at least one free face a coating of thermoplastic material in which amorphous wax predominates by percentage, said wax being applied at a temperature at or slightly above the melting point of the wax, chilling said coating, and applying to the exterior surface of said coating a continuous layer of lacquer which will prevent offsetting of the wax but which will soften under heat to permit passage of the wax therethrough to form a seal under heat and pressure.

7. The method of forming a moistureproof flexible material adapted to be used for wrappers or the like and which comprises applying to at least one side of a base which includes a metal foil having at least one free face a coating of thermoplastic material in which amorphous wax predominates by percentage, said wax being applied at a temperature at or slightly above the melting point of the wax, chilling said coating, and applying to the exterior surface of said coating a continuous layer of fusible lacquer which will prevent offsetting of the wax but permit passage of the wax therethrough to form a seal under heat and pressure, and then drying the lacquer at a temperature below the melting point of the wax.

ROGER E. LAUFER.